June 28, 1932.    J. C. McCUNE    1,865,126
FLUID PRESSURE BRAKE
Filed June 24, 1930
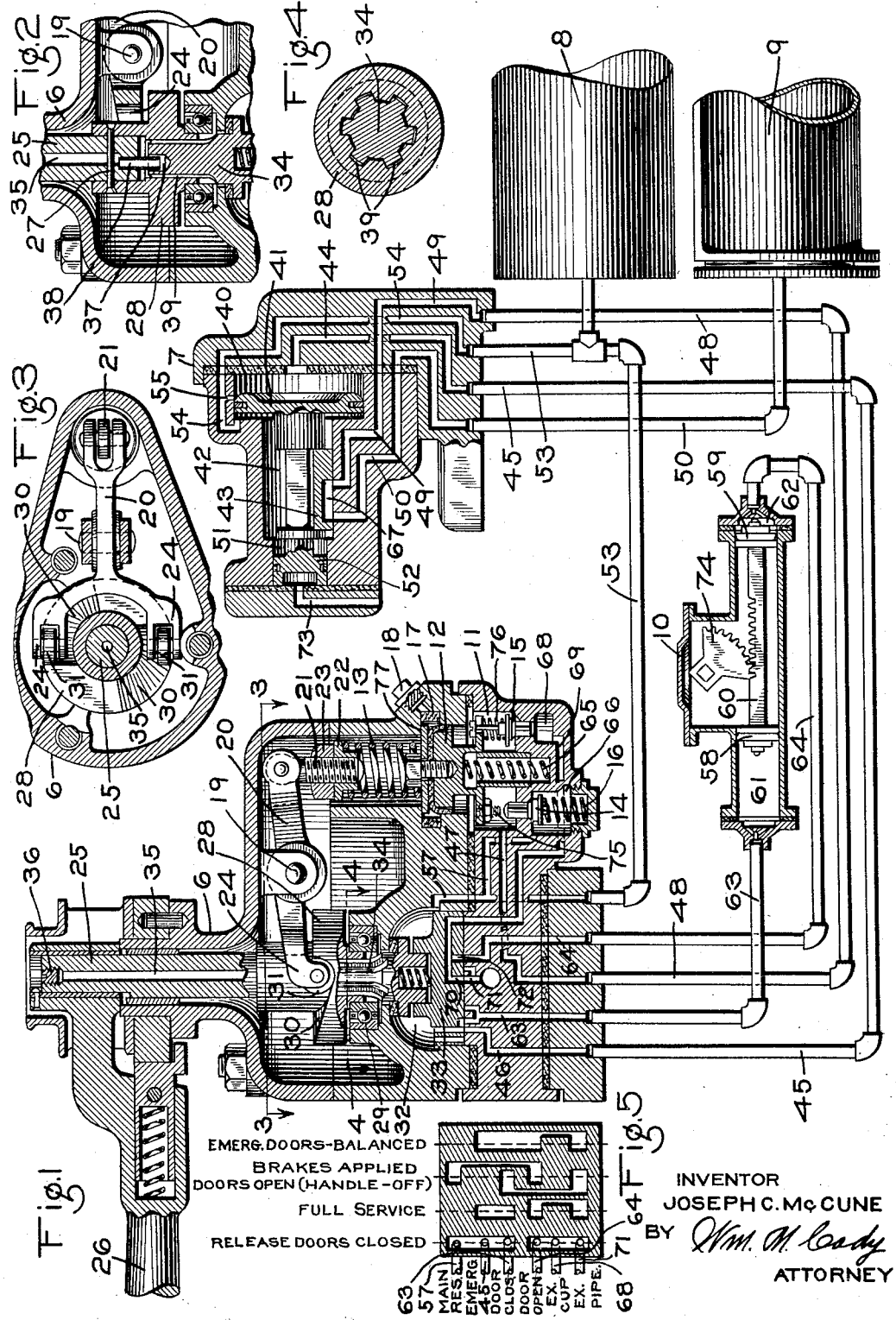
INVENTOR
JOSEPH C. McCUNE
BY Wm. M. Cady
ATTORNEY Patented June 28, 1932

1,865,126

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed June 24, 1930. Serial No. 463,387.

This invention relates to improvements in fluid pressure brakes and more particularly to means for controlling the application and release of the brakes and also the opening and closing of the car doors.

An object of the invention is to provide an improved fluid pressure brake equipment having a service application valve device and an emergency valve device separate from the service valve device, both valve devices being controlled by a single handle.

Another object of the invention is to provide an improved fluid pressure brake equipment of the above type in which separate valve means are employed for effecting service and emergency applications of the brakes, the emergency application of the brakes being controlled by a rotary valve device which also controls the car door engine.

Another object of the invention is to provide an improved fluid pressure brake equipment of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing; Figure 1 is a diagrammatic sectional view of a fluid pressure brake equipment constructed according to the invention, showing the same in release position; Fig. 2 is a detail section of a portion of the brake valve device shown in Fig. 1, illustrating the manner in which lubricant is supplied to the ball bearing; Fig. 3 is a horizontal section taken on the line 3—3 of Fig. 1; Fig. 4 is a horizontal section taken on the line 4—4 of Fig. 1; Fig. 5 is a development view showing the connections made between the rotary valve and its seat in the several positions of the brake valve handle.

Referring to the drawing, the equipment may comprise a brake valve device 6, an emergency valve device 7, a main reservoir 8, a brake cylinder 9 and a door engine 10.

The brake valve device 6 comprises a casing having a piston chamber 11 containing a piston 12 subject on one side to the pressure of a heavy coil spring 13 and subject on the opposite side to the pressure of a light coil spring 65, as well as to fluid under pressure supplied to chamber 11 during the operation of the device, as will be hereinafter more fully described.

Contained in the casing and disposed beneath the piston 12, is a fluid pressure supply valve 14 and an exhaust or release valve 15. The release valve 15 is operatively connected to the piston 12, so that in normal release position, the valve is held off its seat. The supply valve 14 is normally held seated by a spring 16 and is adapted to be unseated by the downward movement of the piston 12.

The portion of the casing adjacent to the piston 12 is recessed to receive a ring 17 composed of felt or the like and adapted to be impregnated with a lubricant supplied through an opening in the outer wall of the casing which is closed by a plug 18.

Pivotally mounted on a pin 19 within the casing of the brake valve device 6, is a lever 20. At one side of the pivot pin 19, the lever has a single arm, to the extremity of which is pivoted a depending threaded stem 21.

Mounted on the stem 21, is a flanged bushing 22 which engages the upper end of the spring 13. The bushing 22 is locked in adjusted position by means of a lock nut 23.

The arm of the lever 20 at the opposite side of the pivot pin 19 is forked, as at 24, so as to straddle the main shaft 25 of the brake valve device 6, said shaft being provided with the usual removable operating handle 26.

Mounted on the lower end of the shaft 25 and fixed thereto by means of a pin 27 (see Fig. 2), is a cam 28, which is supported by an annular ball bearing 29. The upper surface of the cam 28 is provided with a pair of diametrically disposed cam faces 30, on which ride rollers 31 journalled to the extremities of the forked ends 24 of the lever 20.

The casing of the brake valve 6 is also provided with a valve chamber 32 containing a rotary slide valve 33 adapted to be operated by the handle 26.

For the purpose of connecting the rotary valve 33 to the shaft 25, a member 34 is provided, said member having an upstanding neck portion splined to the cam 28.

In order to supply lubricant to the ball bearing 29, the shaft 25 is provided with a longitudinal bore 35, which is closed at the top by a removable plug 36 and which is connected to a recess 37 in the top of the member 34 by a tube 38. The top of the member 34 is spaced slightly from the lower portion of the cam 28 and the channels 39 provided by the splined connection between the member 34 and the cam 28 serve as means for conducting the lubricant to the ball bearing 29. The emergency valve device 7 may comprise a casing having piston chambers 40, 51, containing connected pistons 41, 52, respectively, and a valve chamber 42 between the piston chambers, containing a slide valve 43 adapted to be operated by said pistons.

The piston chamber 41 is connected to the rotary valve chamber 32, by a passage 44, pipe 45 and passage 46.

The piston chamber 11 is connected to the seat of the slide valve 43, by passage 47, straight air pipe 48 and passage 49.

The brake cylinder 9 is connected to the seat of the slide valve 43 by pipe and passage 50.

The piston chamber 51 is connected to the valve chamber 42, and the said valve chamber is connected to the main reservoir pipe 53 by a passage 54. When the valve 43 is in release position, as shown in Fig. 1, piston 41 uncovers a port 55 connecting passage 54 with piston chamber 40.

The main reservoir pipe 53 is connected to the valve chamber 32 and also to the chamber 56 of the supply valve 14, through a passage 57.

The door operating engine 12 may comprise two pistons 58 and 59, which are connected by a stem 60, provided on one side with a rack of gear teeth, which mesh with the teeth of a gear segment 74 for operating the car door (not shown).

The piston 58 has at one side a chamber 61, while the piston 59 has at the opposite side a chamber 62. The chamber 61 is connected to the seat of the rotary valve 33, by a pipe and passage 63 and the chamber 62 is connected to the seat of the rotary valve 33, by a pipe and passage 64.

In operation, when the handle 26 is in release position, the rollers 31 of the lever 20 are disposed in the bottom of the cam faces 30 of the cam 28 so that the opposite end of the lever 20 is elevated. Piston 12 is held in its up position by spring 65, and therefore the release valve 15 will be held unseated by the piston 12, and the supply valve 14 will be held seated by spring 16.

Fluid under pressure is supplied from the main reservoir 8 to valve chamber 42 of the emergency valve device 7, through pipe 53 and passage 54, and to piston chamber 40 of said valve device, through pipe 53, passage 57, rotary valve chamber 32, passage 46, pipe 45, and passage 44. Chamber 66 of the supply valve 14 is also supplied with fluid under pressure in the same manner, through passage 57.

The side of piston 52 opposite to chamber 51 is open to the atmosphere, through passage 73, and since the pressure of the fluid on both sides of the emergency valve piston 41 will be substantially equal, as supplied from the main reservoir 8, the pressure of the fluid in chamber 51 acting on the smaller piston 52, shifts the pistons and slide valve 43 to the left to release position, as shown in Fig. 1.

In release position, the brake cylinder 9 is vented to the atmosphere, through pipe and passage 50, cavity 67 in the emergency slide valve 43, passage 49, pipe 48, passage 47, piston chamber 11, past unseated release valve 15 to cup 68, and thence through passage 69, port 70 in the rotary valve 33, and atmospheric passage 71.

In release position, piston chamber 61 of the door engine 10 is charged with fluid under pressure from the main reservoir 8, through pipe 53, passage 57, rotary valve chamber 32, and passage and pipe 63. Piston chamber 62 of said door engine is vented to the atmosphere, through pipe and passage 64, ports 72 and 70 in the rotary valve 33 and atmospheric passage 71. With the piston chamber 62 vented to the atmosphere and the piston chamber 61 supplied with fluid under pressure, the pistons 58 and 59 will be shifted to the right or door closed position.

When it is desired to effect a service application of the brakes, the handle 26 is operated in the usual manner to rotate the cam 28 and rotary valve 33. As shown in Fig. 5, in effecting a service application of the brakes, the rotary valve 33 laps the ports leading respectively, to the door engine cylinder 61 and to the emergency valve piston chamber 40, and it is necessary to move the handle 26 to handle off position, in which the brakes are fully applied, before the door engine can be operated to open the car doors.

In the rotative movement of the cam 28, the inner forked end 24 of the lever 20 is raised by the engagement of the rollers 31 with the upwardly inclined cam faces 30, and this action depresses the opposite or outer end of said lever, thereby causing the bushing 22 to move down and compress the spring 13.

Since the spring 13 acts on the piston 12, said piston will be moved downwardly by the pressure of the spring. In the downward movement of the piston, the release valve spring 76 is compressed and acts on the release valve 15 to seat the same, thereby closing the communication through which the piston chamber 11 is connected to the atmosphere, and the stud 75 carried by the piston 12 engages the supply valve 14 and unseats the same.

Fluid under pressure is then admitted to piston chamber 11 from the valve chamber 66, and from thence flows through passage 47, pipe 48, passage 49, cavity 67 in the emergency valve 43 and passage and pipe 50, to the brake cylinder 9, to effect an application of the brakes.

When the pressure in piston chamber 11, acting on the piston 12, slightly exceeds the opposing pressure of the spring 13, the piston 12 will be moved upwardly, so as to permit the supply valve 14 to be seated by the spring 16 and thus cut off the further supply of fluid under pressure to the brake cylinder. Since the upward movement of the piston 12 will be slight, the release valve 15 will be held seated by its spring 76.

It will now be seen that both the supply valve 14 and the release valve 15 are closed or lapped, and the parts will remain in this position, as long as the pressure in the brake cylinder corresponds with the pressure to which the spring 13 is set.

While the brakes are applied, the brake cylinder pressure may be increased by turning the handle 26 so as to further compress the spring 13, whereby the stud 75 is again operated by the downward movement of the piston 12 so as to again open the supply valve 14. When the pressure in the brake cylinder and in piston chamber 11 has been increased to correspond with the increased pressure of spring 13, the valve 14 will be again closed, in the manner hereinbefore described.

If leakage from the brake cylinder should occur while the handle 26 is in a given brake applying position, the reduced pressure of the brake cylinder in chamber 11 acting on the piston 12 will permit the spring 13 to operate piston 12, so as to open the supply valve 14 and admit fluid to the brake cylinder to compensate for the leakage.

The amount of brake cylinder pressure obtained is determined by the position of the handle 26, the maximum pressure being obtained in handle off position in which the rollers 31 engage the upper flat face of the cam 28.

When it is desired to release the brakes, the brake valve handle 26 is turned toward release position, so that a reduction in the compression of spring 13 is effected. This reduction in spring pressure on piston 12 causes the higher brake cylinder pressure on the opposite side of the piston to move the piston upwardly, and this action lifts the release valve 15 from its seat. Fluid under pressure in the brake cylinder will then be vented from piston chamber 11 and the brake cylinder, to the atmosphere, so as to effect the release of the brakes.

When the handle 26 is in release position, the spring 65 maintains the piston 11 seated against the shoulder 77 and the release valve 15 is thereby held open. In this position, the spring 13 is not under compression, but said spring retains the outer end of the lever 20 up, so that the rollers 31 engage the cam faces 30.

When the vehicle is brought to a stop after an application of the brakes, if it is desired to open the doors, the handle 26 is turned to handle off position (see Fig. 5) so that door engine piston chamber 61 is vented to the atmosphere, through passage 71, and fluid under pressure is supplied from the rotary valve chamber 32 and the reservoir 8 to the door engine piston chamber 62, through passage and pipe 64, thereby operating the pistons 58 and 59 and the gear 74 so as to open the car doors.

When it is desired to close the doors, the handle may be turned to full service position or said handle may be turned toward release position, since in either case, the door engine piston chamber 62 is vented to the atmosphere and the piston chamber 61 is supplied with fluid under pressure in the manner heretofore described so that the pistons 58 and 59 and the gear 74 will be operated to close the car doors.

When it is desired to effect an emergency application of the brakes, the handle 26 is turned to emergency position in which the lever 20 is operated in the manner heretofore described to compress the spring 13 which in turn operates the piston 12 to close the release valve 15 and open the supply valve 14, and in which the rotary valve 33 is moved to the position in which the fluid in piston chamber 40 of the emergency valve device 7 is vented to the atmosphere through passage 71 (see Fig. 5).

With the reduction in fluid pressure in piston chamber 40, the high pressure of fluid in valve chamber 42, then moves the pistons 41 and 51 and the slide valve 43 toward the right to emergency position, in which the slide valve 43 uncovers the passage 50. Fluid under pressure is then supplied to the brake cylinder 9 at a rapid rate from the main reservoir 8, through pipe 53, passage 54, valve chamber 42, and passage and pipe 50. In this way, when an emergency application of the brakes is effected, the same service brake application takes place as has heretofore been described, and in addition, the emergency valve device 7 connects the brake cylinder 9 directly with the main reservoir 8, so that pressure is built up in the brake cylinder to approximately the same value as that in the main reservoir. Should the emergency valve device 7 fail to operate from any cause, an application of the brakes is assured, since the piston 12 is also operated when an emergency application of the brakes is being effected.

In the emergency position of the handle 26, the door closing pipe 63, as well as the door opening pipe 64, are both open to the atmosphere. With the pistons 58 and 59 subject to atmospheric pressure, the car doors may be operated by hand in the usual well known manner.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, of an emergency valve device adapted to be automatically operated for supplying fluid under pressure to the brake cylinder to effect an emergency application of the brakes, a separate valve device for controlling the supply and release of fluid under pressure to and from the brake cylinder for effecting a service application of the brakes, a shaft, a rotary valve mounted on the shaft for controlling the operation of said emergency valve device, a cam also mounted on the shaft, mechanism operated by said cam for operating said service application valve device, and means interposed between said mechanism and said service application valve device adapted to operate said valve device in proportion to the degree of rotation of said cam.

2. In a fluid pressure brake, the combination with a brake cylinder, an emergency brake pipe and source of fluid under pressure, of an emergency valve device operated upon a sudden reduction in emergency brake pipe pressure for supplying fluid under pressure from the source to the brake cylinder to effect an emergency application of the brakes, a separate valve device for controlling the supply and release of fluid under pressure to and from the brake cylinder for effecting a service application of the brakes, a shaft, a valve mounted on the shaft for controlling the operation of said emergency valve device, a cam also mounted on the shaft, a lever operated by said cam for operating said service application valve device, a spring interposed between said lever and said service application valve device adapted to exert a yieldable force on said valve device in accordance with the degree of rotation of said cam and means for operating the shaft.

3. In a fluid pressure brake, the combination with a brake cylinder, emergency brake pipe and source of fluid under pressure, of a fluid pressure actuated door engine having a cylinder, a valve device for controlling the supply and release of fluid under pressure to and from the brake cylinder for effecting an application of the brakes, a shaft, a valve mounted on the shaft for supplying fluid under pressure to said door engine cylinder, a cam also mounted on the shaft, means operated by said cam for operating said valve device, and means for operating the shaft.

4. In a fluid pressure brake, the combination with a brake cylinder, emergency brake pipe and source of fluid under pressure, of an emergency valve device for supplying fluid under pressure at a rate to effect an emergency application of the brakes, a fluid pressure actuated door engine, a separate valve device for controlling the supply and release of fluid under pressure to and from the brake cylinder for effecting a service application of the brakes, a shaft, a valve mounted on the shaft for controlling the supply of fluid under pressure to said emergency valve device and said door engine after a service application of the brakes, a cam also mounted on the shaft, means operated by said cam for operating said service application valve device, and means for operating the shaft.

5. In a fluid pressure brake, the combination with a brake cylinder, brake pipe and source of fluid under pressure, of an emergency valve device for supplying fluid under pressure at a rate to effect an emergency application of the brakes, a fluid pressure actuated door engine, a separate valve device for controlling the supply and release of fluid under pressure to and from the brake cylinder for effecting a service application of the brakes, a shaft, a rotary valve mounted on said shaft for controlling the operation of said emergency valve device and said door engine, said rotary valve device preventing the operation of the emergency valve device and the door engine when a service application of the brakes is being effected, a cam also mounted on the shaft, means operated by said cam for operating said service application valve device, and means for operating the shaft.

6. In a fluid pressure brake, the combination with a brake cylinder, of an emergency valve device adapted to be automatically operated upon a sudden decrease in fluid pressure for supplying fluid under pressure to the brake cylinder to effect an emergency application of the brakes, a separate valve device for controlling the supply and release of fluid under pressure to and from the brake cylinder for effecting a service application of the brakes, said service application valve device comprising a release valve, a separate fluid supply valve movable independently of the release valve, a movable abutment for first seating the release valve while the supply valve is seated and for then unseating the supply valve while the release valve remains seated, a spring acting on said abutment, a lever engaging said spring, a shaft, a cam device mounted on said shaft and having a cam face for operating said lever, means for operating the shaft, and a rotary valve also mounted on the shaft for controlling the operation of said emergency valve device.

In testimony whereof I have hereunto set my hand, this 20th day of June, 1930.

JOSEPH C. McCUNE.